United States Patent
Mui et al.

(10) Patent No.: US 7,251,063 B2
(45) Date of Patent: Jul. 31, 2007

(54) AUTOMATIC DOCUMENT FEEDER

(75) Inventors: Paul K. Mui, Boise, ID (US); Eric L. Andersen, Meridian, ID (US); Russell A. Mendenhall, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1064 days.

(21) Appl. No.: 10/310,350

(22) Filed: Dec. 5, 2002

(65) Prior Publication Data

US 2004/0109207 A1 Jun. 10, 2004

(51) Int. Cl.
*H04N 1/04* (2006.01)

(52) U.S. Cl. .................. 358/498; 358/496; 358/497; 358/474; 399/367

(58) Field of Classification Search .............. 358/498, 358/496, 488, 474, 401, 501, 505, 408; 399/367–375; 355/23, 24; 271/109, 264
See application file for complete search history.

(56) References Cited

U.S. PATENT DOCUMENTS

| | | | |
|---|---|---|---|
| 4,991,833 A | 2/1991 | Minami et al. | |
| 5,734,483 A | 3/1998 | Itoh | |
| 5,878,319 A * | 3/1999 | Itoh | 399/367 |
| 5,914,791 A | 6/1999 | Lin | |
| 6,120,017 A | 9/2000 | Tanjo et al. | |
| 6,175,660 B1 * | 1/2001 | Nabeshima et al. | 382/274 |
| 6,441,929 B1 * | 8/2002 | Shida | 358/488 |
| 6,457,707 B1 | 10/2002 | Hendrix et al. | |
| 6,512,602 B1 * | 1/2003 | Sheng et al. | 358/498 |
| 6,618,575 B2 * | 9/2003 | Takida et al. | 399/367 |
| 6,643,037 B1 * | 11/2003 | Jeran et al. | 358/488 |
| 6,738,167 B1 * | 5/2004 | Suzuki | 358/498 |
| 6,746,013 B2 * | 6/2004 | Shih | 271/186 |
| 6,768,893 B1 * | 7/2004 | Andersen et al. | 399/367 |
| 6,877,742 B2 * | 4/2005 | Nishikata et al. | 271/264 |
| 6,947,187 B2 * | 9/2005 | Mui et al. | 358/496 |
| 7,032,900 B2 * | 4/2006 | Nishikata et al. | 271/264 |
| 7,038,819 B2 * | 5/2006 | Fang et al. | 358/474 |

* cited by examiner

*Primary Examiner*—Cheukfan Lee

(57) ABSTRACT

A representative embodiment provides for an automatic document feeder apparatus configured for use in conjunction with an imaging device, and includes a feed guide supported in spaced overlying relation to a scan window of the imaging device. The automatic document feeder further includes a first document guide and a second document guide. The first and second document guides are supported in spaced relation to each other and are configured to guide a sheet media between the feed guide and the scan window. In use, the sheet media is the only element present between the scan window and the feed guide. Another representative embodiment provides for a method of automatically feeding documents, including guiding a sheet media into a gap that is defined by a scan window and a feed guide, and guiding the sheet media out of the gap.

6 Claims, 5 Drawing Sheets

AUTOMATIC DOCUMENT FEEDER

BACKGROUND

Use of automatic document feeder (ADF) devices in conjunction with imaging equipment is known. Typically, ADFs transport and guide sheet media past a portion of a glass sheet or scan window. A scanning device underlying the scan window optically reads any markings that may be present on the sheet media, and transfers corresponding signals to an imaging system. The imaging system then performs any number of tasks using the signals, such as forming a copy or sending a facsimile of the scanned media, etc.

One aspect of importance to the media scanning process is the proximity of the scanned media to the scan window. The scan window is typically an optically transparent element through which a scanning light source and sensor or the like projects light towards the sheet media as the sheet is moved past the scan window. The scan window also allows for light reflected from the document being scanned to be projected to a photosensor array to thereby allow an image on the scanned sheet to be recorded. The scan window can be a separate component, or it can be a defined portion of a larger platen, as in the case of a flat bed scanner that is provided with an ADF. In the latter case, a document can be scanned by either providing it to the scan window via the ADF, or by placing the document directly on the platen.

In the case where a document is scanned from the ADF, the document is moved past the scan window while the scanning device (which incorporates the scanning light source) is held stationary; in the case where a document is scanned from the platen, the document is held stationary while the scanning device is moved past the document.

Monochrome (i.e., black and white) image scanning is relatively tolerant of varying distance (or "flutter") between the sheet media and the scan window. In contrast, color image scanning requires a more tightly controlled distance between the media and the scan window, so as to avoid problems in color recognition (i.e., registration). Therefore, ADF devices used in color imaging equipment require a sheet media guidance design that is generally more complex and has a tighter tolerance than that of a monochrome imaging system.

One approach to providing an ADF for use in color imaging involves the use of a transparent sheet guide element. The transparent sheet guide is located within a gap between an overlying feed guide and the underlying scan window. The transparent guide element has a curvature that serves to guide flexible sheet media through the gap during a scanning operation.

During the course of repeated use, the transparent guide element can become soiled or scratched, resulting in unsatisfactory color registration and image quality (i.e., poor copies or facsimiles). Correcting this soiled or scratched condition generally requires a user to remove the transparent guide element from the associated ADF and either clean and reinstall the guide element, or replace it with a new guide element. In any case, the corrective maintenance procedure is both time consuming and undesirable.

Therefore, it is desirable to provide an improved automatic document feeder that avoids the maintenance burdens described above.

SUMMARY

One embodiment provides for an automatic document feeder configured for use in conjunction with an imaging device comprising a feed guide supported in spaced overlying relation to a scan window of the imaging device. The automatic document feeder further includes a first document guide and a second document guide. The first and second document guides are supported in spaced relation to each other and are configured to guide a sheet media between the feed guide and the scan window. In use, the sheet media is the only element present between the scan window and the feed guide.

Another embodiment provides for sheet guiding apparatus for use in a document feeder configured to work in conjunction with a scanning apparatus. The scanning apparatus includes a scan window having an upper surface. The sheet guiding apparatus comprises first and second document guides in a spaced-apart relationship. Thus, a void is defined between the first and second document guides and is not bridged by a bridging component. The first and second document guides are configured to guide a sheet media across the void through a gap defined by a lower surface of a feed guide and the upper surface of the scan window.

Yet another embodiment provides for a scanning apparatus comprising a flatbed of optically transparent material and having a region defining a scan window. A feed guide is supported in spaced overlying relation to the scan window and is configured to guide a sheet media through a gap between the feed guide and the scan window. The scanning apparatus further includes a first document guide supported in a generally sloped, lateral relation to the scan window. The first document guide is configured to guide the sheet media into the gap. The scanning apparatus also includes a second document guide supported in a generally sloped, lateral relation to the scan window and configured to guide the sheet media out of the gap.

Still another embodiment provides a method of automatically feeding documents. The method includes the acts of providing a flatbed having a scan window region, and a feed guide that is supported in spaced relation to the scan window. The method further includes guiding a sheet media into a gap that is defined by the scan window and the feed guide, and guiding the sheet media out of the gap, wherein the sheet media is the only element present within the gap.

These and other aspects and embodiments will now be described in detail with reference to the accompanying drawings, wherein:

DETAILED DESCRIPTION

In representative embodiments, the present teachings provide methods and apparatus for an automatic document feeder ("ADF"), and particularly methods and apparatus for guiding sheet media in an ADF. As will be described more fully below, embodiments of the present invention provide for an ADF having a sheet guide which does not introduce a second optical element (i.e., an optical element other than the scan window) between the scanning light source and the document being scanned. Eliminating the second optical element removes an element that can become scratched and/or soiled. The embodiments of sheet guides described herein also result in low flutter of the document being scanned. Accordingly, methods and apparatus of the present invention are particularly useful in color scanning apparatus.

Figure 1:
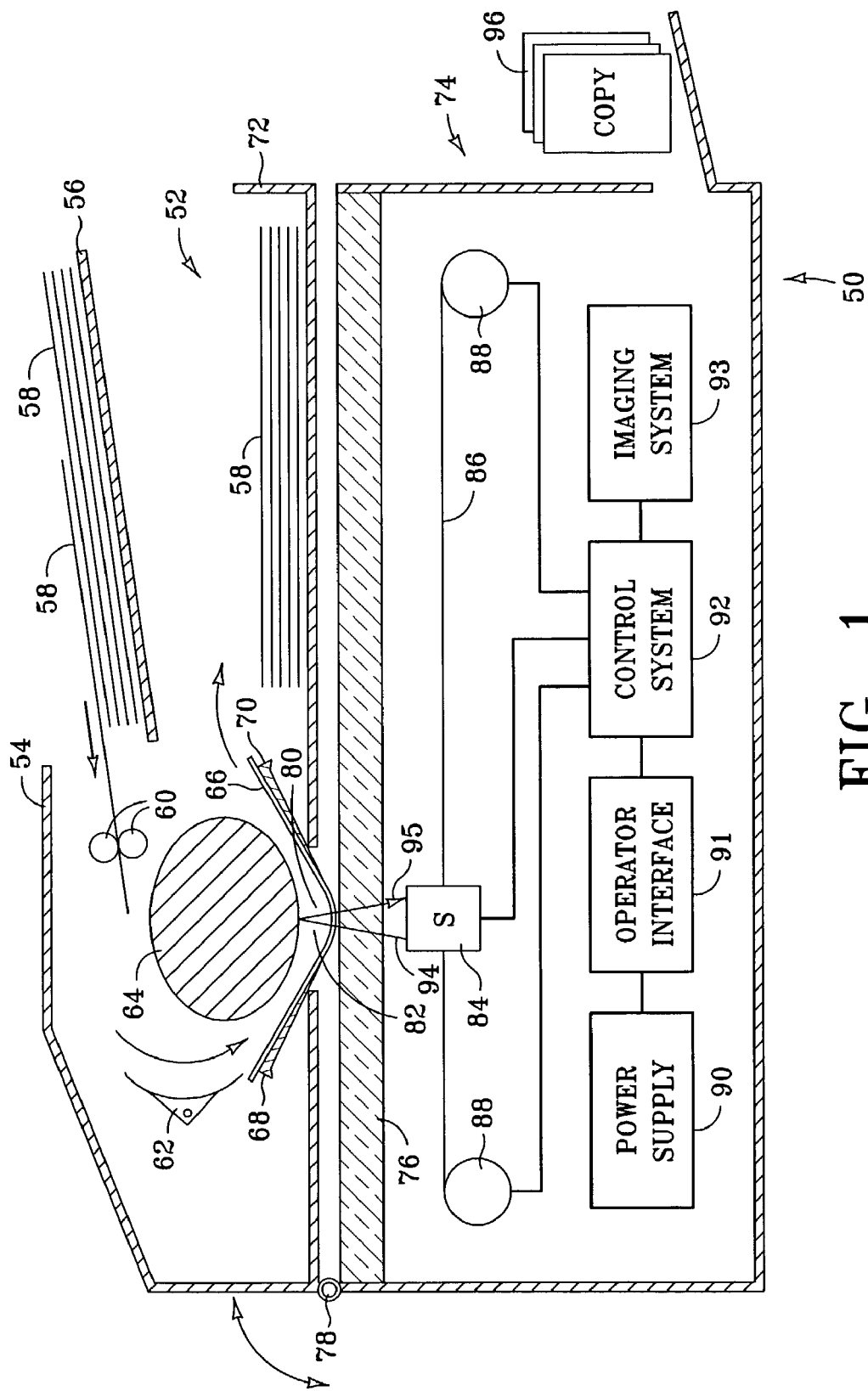
FIG. 1 is a side elevation sectional view generally depicting an imaging device and associated automatic document feeder, in accordance with the prior art.

FIG. 1 is a side elevation sectional view generally depicting an exemplary imaging device in accordance with the prior art, and generally referred to as numeral 50. Imaging device 50 includes an automatic document feeder (hereafter, ADF) 52. The ADF 52 includes a housing 54 that generally contains and supports a plurality of elements described hereafter. The ADF 52 includes document media input tray 56 that serves to receive and support one or more sheets of media 58 to be optically scanned by imaging device 50.

The ADF 52 further includes pickup and feed rollers 60. The rollers 60 cooperate under motor propulsion (not shown) to grasp and transport media sheets 58 through the ADF 52, one sheet at a time. Further included with ADF 52 is a curved guide element 62 that routes media sheets 58 toward the optical scanning area (discussed hereafter) of imaging device 50. The ADF 52 further includes a feed guide 64, a transparent sheet routing element 66, and a plurality of support elements 68 and 70 that support the sheet routing element 66. Accordingly, the sheet routing element 66 acts as a bridging component or element between the support elements 68 and 70 to cover the scan window 82 (described below). One material that is known to be used to form such a sheet routing element 66 is manufactured under the trade name Mylar®. Mylar® is a registered trademark of the E. I. Du Pont de Nemours and Company Corp., of Wilmington, Del.

The feed guide 64 and the sheet routing element 66 cooperate to guide individual media sheets 58 through the ADF 52. Furthermore, the feed guide 64 and the sheet routing element 66 are in closely spaced proximity such that the sheet media 58 may freely pass there between, but do so relatively free from flutter or undesired motion. In this way, the ADF 52 is typically suitable for use with color image-bearing sheet media 58. Media sheets 58 that have been guided through the ADF 52, by way of the feed guide 64 and the sheet routing element 66, are received in an output tray 72.

The imaging device 50 further includes imaging apparatus 74, which is depicted as generally underlying ADF 52. The imaging apparatus 74 includes a flatbed 76, typically comprised of glass or a similar optically transparent material. The ADF 52 can be hingedly connected to the imaging apparatus 74 by hinge 78, so that the ADF 52 can be rotated clear of the flatbed 76 and a document can be placed on the flatbed 76 for scanning (described hereafter). When operated in the automatic document scanning mode, the ADF 52 is typically oriented in the position depicted in FIG. 1.

The flatbed 76, the feed guide 64, and the transparent sheet routing element 66 are supported in spaced relation such that, during use, a gap 80 is defined between the flatbed 76 and the feed guide 64. The sheet routing element 66, being supported by the supports 68 and 70, bridges the gap 80. Further, the area of the flatbed 76 that is substantially directly beneath the feed guide 64 defines a scan window 82. The gap 80 and the scan window 82 are discussed in greater detail hereafter.

The imaging apparatus 74 also includes a scanning device 84. The scanning device 84 is supported by cable, slide rod, or similar means 86, and is positionable by way of controllable positioners 88. It is understood that one of skill in the imaging arts is familiar with various kinds of support and positioners 86 and 88, and that further elaboration is not required.

The imaging apparatus 74 further includes a plurality of subsystem elements 90-93. As depicted, exemplary elements 90-93 include, but are no subsystems as: power supply 90; operator interface 91 for user initiation, control and indication of the various operations of the imaging device 50; control system 92 for automated operation and sequencing of the various elements of imaging device 50; imaging system 93 for processing of the scanned media signals; and other electrical, mechanical, and optical elements (not shown) as needed to carry out normal operation of the imaging device 50. The various subsystem elements 90-93 are electrically and mechanically coupled with each other and with scanning device 84 as needed. Further elaboration of elements 90-93 is not required for purposes herein.

In normal operation, the imaging device 50 performs as follows: one or more sheets of media 58 are placed on input tray 56. The operation of the device 50 is initiated by way of the operator interface 91 or by remote signal such as from a remote personal computer (not shown). The rollers 60 within the ADF 52 grasp the first (i.e., top) sheet 58 within the tray 56 and transport it along the path defined by the curved element 62, the feed guide 64, and the transparent sheet routing element 66, with the sheet media 58 ultimately coming to rest in the output tray 72.

As the sheet 58 passes through the gap 80, the scanning device 84 provides a light beam 94 that is directed through the scan window 82 and the transparent routing element 66, and toward the feed guide 64. The light beam 94 strikes the passing sheet 58 and returns to the scanning device 84 as a reflected beam 95. The reflected beam 95 is detected by scanning device 84, which generates a scan signal (not shown) corresponding to the image content of the passing sheet 58. The scan signal (not shown) is then routed to the control system 92 of the imaging apparatus 74. As depicted in FIG. 1, the imaging device 50 can produce a set of copies 96 in correspondence to the scanned media sheets 58. Alternately, the scanned sheets can be stored in a computer readable memory device as an electronic file for later use and processing.

In typical use, the transparent sheet routing element 66 can come into contact with the sheet media 58 passing there over. As a result, the routing element 66 may become soiled and/or scratched, requiring removal, cleaning and reinstallation, or replacement. When this occurs, the user is faced with an undesired maintenance burden, as previously described.

The imaging device 50 is depicted as being a photocopier. However, it is understood that automatic document feeders need not be associated with photocopiers alone. Other imaging devices which can utilize ADFs include, but are not limited to: facsimile devices; optical character recognition devices; computer interface scanners; text-to-audio converters; and other devices that are configured to optically scan sheet media and make use of the resulting scan signal.

Figure 2:
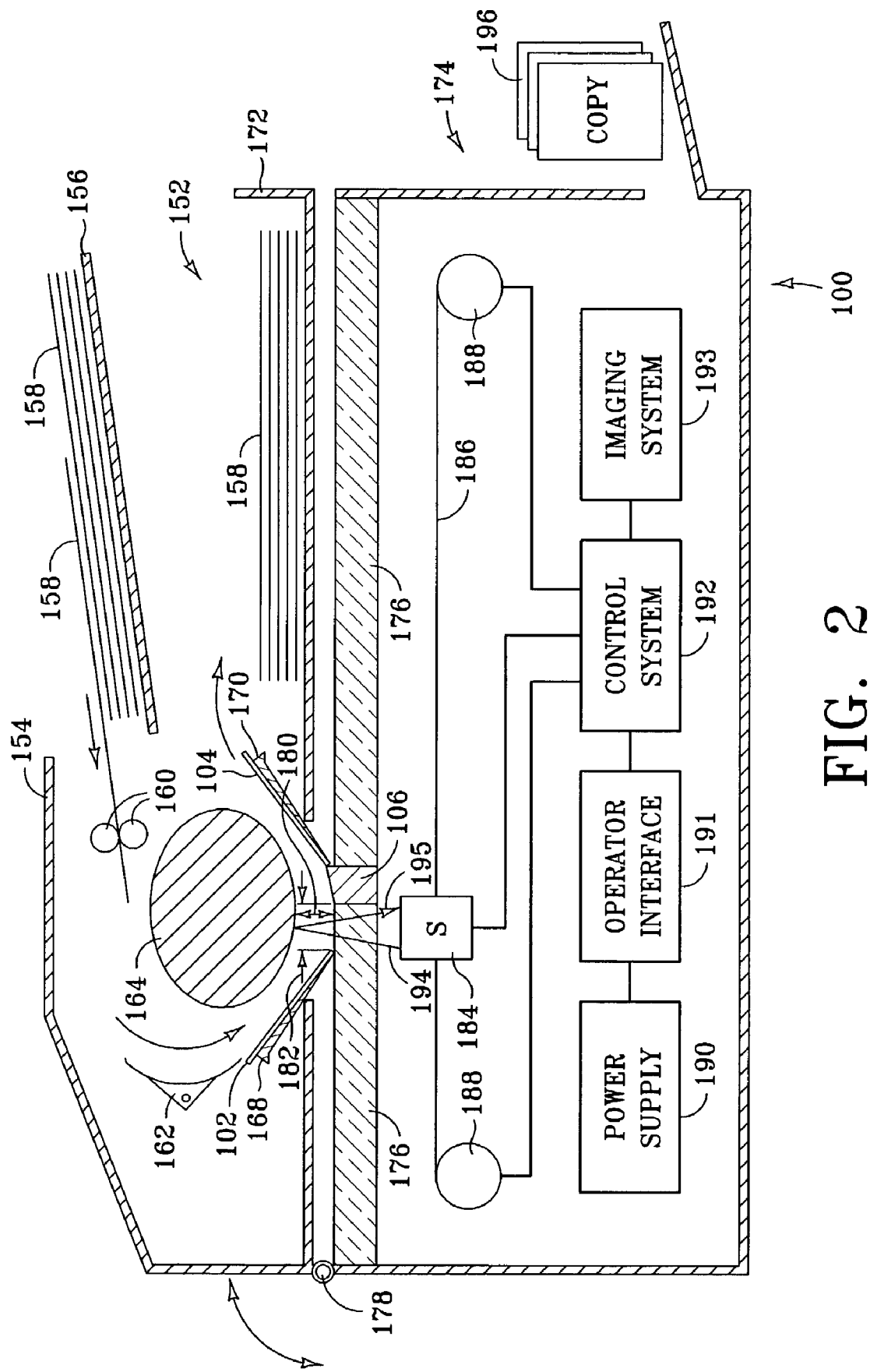
FIG. 2 is a side elevation sectional view depicting an imaging device and associated automatic document feeder, in accordance with one embodiment of the invention.

FIG. 2 is a side elevation sectional view depicting an imaging device 100, having an automatic document feeder (ADF) 152 in accordance with one embodiment of the present invention. The ADF 152 includes a housing 154 ("ADF housing"), an input tray 156, pinch rollers 160, a curved guide element 162, a feed guide 164, and an output tray 172, which are formed, function and cooperate within the context of the ADF 152 substantially as described above for elements 54, 56, 60, 62, 64 and 72, respectively, of FIG. 1. The input tray 156, pickup and feed rollers 160, curved guide element 162, feed guide 164, and output tray 172 can all be supported by the housing 154, either directly or indirectly.

The ADF 152 further includes a first document guide 102, being supported by a support element 168. The ADF 152 also includes a second document guide 104, which is supported by a support element 170. Document guide support elements 168 and 170 can be supported by the ADF housing 154, either directly or indirectly. The first and second document guides 102 and 104 are supported in spaced-apart relationship such that a substantially fixed void is defined there between. The first and second document guides 102 and 104 can be formed from any flexible, resilient material that is suitable for guiding contact with sheet media 158. In one example, the flexible material of elements 102 and 104 is Mylar®. Other materials associated with other variations are possible.

The imaging device 100 further includes an imaging apparatus 174. The imaging apparatus 174 includes a flatbed 176, a scanning device 184, support means 186, positioners 188, and subsystem elements 190, 191, 192 and 193, which are formed, function and cooperate within the context of the imaging apparatus 174 substantially as described above for elements 76, 84, 86, 88, 90, 91, 92 and 93, respectively, of FIG. 1. Further, the ADF 152 is hingedly coupled to the imaging apparatus 174 by hinge element 178, such that the ADF 152 can be pivoted about the hinge 178 and away from the flatbed 176 of the imaging apparatus 174.

When the ADF 152 and the imaging apparatus 174 of the imaging device 100 are positioned as depicted in FIG. 2, the area of the flatbed 176 that is generally underlying the feed guide 164 is defined as a scan window 182. Additionally, the spacing between the lower side of the feed guide 164 and the upper surface of the scan window 182 is defined as a sheet passage gap 180. It will be noted that the gap 180 is continuous, not having an element disposed between the scan window 182 and the feed guide 164 (except during the scanning process, when sheet media 158 can be disposed in the gap 180). That is, the gap 180 is defined only by the scan window 182 and the feed guide 164, and not by any intermediate element (such as the sheet guide 66 of the prior art, as depicted in FIG. 1).

The imaging apparatus 174 further includes a diverter 106 that has a generally wedge-shaped cross section and is located laterally of the scan window 182, being received within the plane of the flatbed 176. The diverter 106 serves to direct the sheet media 158 from the scan window 182 onto the second document guide 104, and on toward the output tray 172. In another embodiment (not shown), the diverter 106 is formed as a region of the flatbed material 176. Other embodiments (not shown) can also be provided to guide sheet media 158 from the scan window area 182 onto the second document guide 104.

Operation of the imaging device 100 is generally as follows: sheet media 158 is drawn from the input tray 156 by the pinch rollers 160, and transported toward the scan window 182. The first document guide 102 cooperates with the feed guide 164 such that the transported media sheet 158 is passed through the gap 180 and over the scan window 182. The scanning device 184 optically reads the image content of the media sheet 158 during its passage through the gap 180, via projected and reflected light beams 194 and 195, respectively.

The scanning device 184 produces a scan signal (not shown) corresponding to the image content of the passing sheet media 158 to the subsystem components 192-193 for processing. The diverter 106, the second document guide 104, and the feed guide 164 cooperate to guide the passing sheet media 158 out of the gap 180 and onto the output tray 172. In this context, the second document guide 104 is in close proximity to, or optionally in contact with, the diverter 106 during normal use. This operation is generally repeated, until all of the sheet media 158 present in the input tray 156 has been passed through the gap 180 and scanned by the scanning device 184. As depicted, the imaging apparatus 174 can render copies 196 corresponding to the image content of the sheet media 158. As described above, in other configurations the imaging apparatus can produce an electronic file of the scanned document, or an electric signal representative of images on the document, for immediate or later use or processing.

It is to be understood that the dimension of the passage gap 180 is sufficient to permit the sheet media 158 to pass freely through the gap 180, but is also minimized (within dimensions of anticipated sheet media to be received within the gap 180) so as to substantially attenuate any undesired flutter or motion of the sheet media 158 during passage. Therefore, the ADF 152 addresses the color registration issues previously discussed.

The sheet media 158 that pass through the gap 180 can do so while contacting the scan window 182, which can in turn require periodic cleaning. This cleaning is readily facilitated by pivoting the ADF 152 about the hinge 178 and away from the flatbed 176. It is noted that no elements of either the ADF 152 or the imaging apparatus 174 need to be removed, reinstalled, or replaced during such a cleaning operation; thus, the present invention relieves the user of the maintenance burden generally associated with the prior art (i.e., removal, cleaning, and/or replacement of the transparent sheet routing element 66 of FIG. 1).

Figure 3:
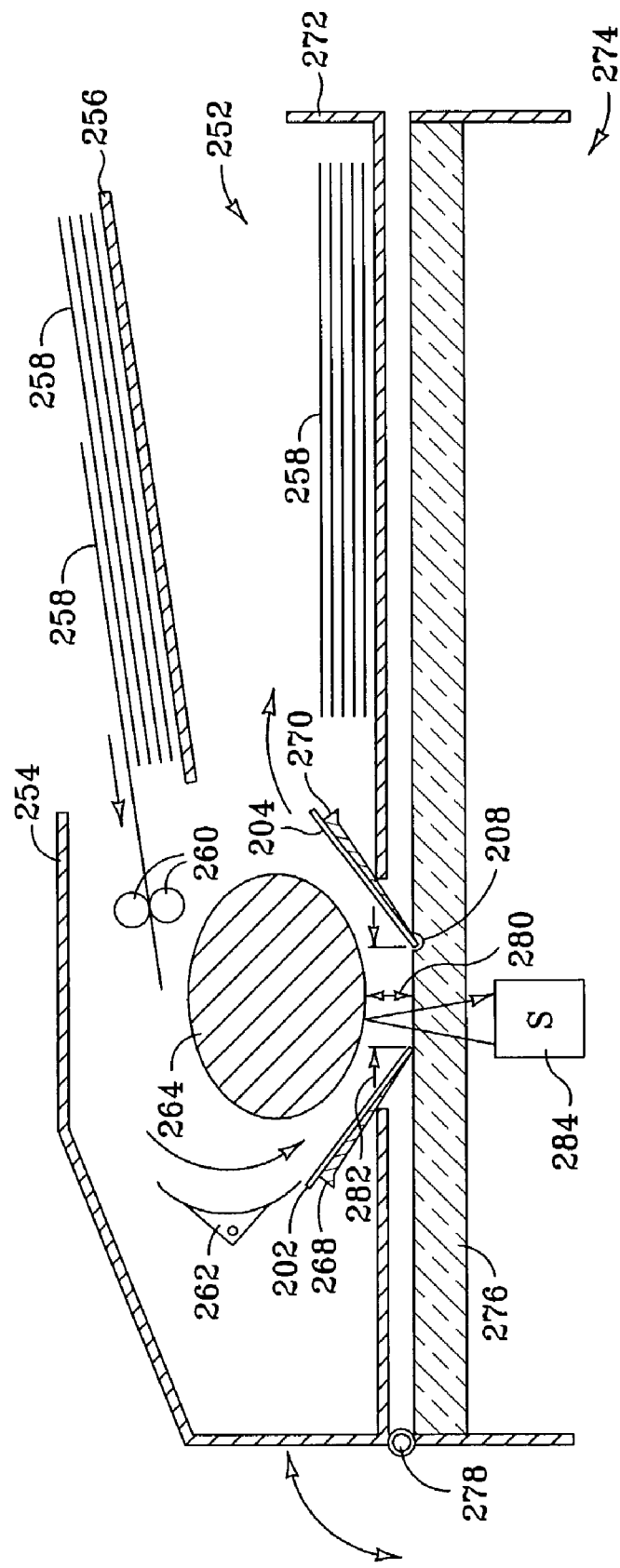
FIG. 3 is a side elevation view depicting details of an automatic document feeder, in accordance with another embodiment of the invention.

FIG. 3 depicts details in side elevation section view of an ADF 252 and a portion of an associated imaging apparatus 274, in accordance with another embodiment of the present invention. The ADF 252 includes a first document guide 202, a housing 254, an input tray 256, pickup and feed rollers 260, a curved guide element 262, a feed guide 264, support elements 268 and 270, and an output tray 272, which function and cooperate substantially as previously described for elements 102, 154, 156, 160, 162, 164, 168, 170, and 172, respectively, of FIG. 2. The ADF 252 further includes a second document guide 204 that is generally laterally spaced-apart from the first document guide 202.

The imaging apparatus 274 includes a flatbed 276, typically fabricated from glass or another suitable transparent material. The flatbed 276 includes a scan window 282. As depicted, the lower surface of the feed guide 264 and the upper surface of the scan window 282 define a passage gap 280. The flatbed 276 includes a channel 208 in the upper surface of the flatbed 276, and located laterally of the scan window 282. The imaging apparatus 274 also includes a scanning device 284, operating substantially as previously described for element 184 of FIG. 2. Further, the ADF 252 and the imaging apparatus 274 can be pivotally separated by way of a hinge-coupling element 278.

In use, the ADF 252 and the imaging apparatus 274 cooperate as follows: sheet media 258 are drawn and routed, one sheet at a time, from the input tray 256 into the ADF 252 much as previously described. The first document guide 202 and the feed guide 264 cooperate to route the sheet media 258 into the gap 280 and over the scan window 282, where the media 258 is scanned by the scanning device 284.

The second document guide 204, being of generally sloped orientation with respect to the flatbed 276, has a lower end received in the channel 208. As the sheet media 258 passes through the gap 280, the leading edge of the media 258 comes into contact with the second document guide 204 and is routed generally away from the scan window 282. As the passage of the sheet media 258 progresses, the feed guide 264 and the second document guide 204 cooperate to route the sheet media 258 out of the gap and onto the output tray 272. The balance of the operation and cooperation of the ADF 252 and the imaging apparatus 274 is substantially as previously described with respect to the apparatus 100 of FIG. 1.

The scan window 282 can be cleaned, if necessary, through the pivoting of the ADF 252 about the hinge 278, and away from the flatbed 276. When any required cleaning of the scan window 282 is complete, the ADF 252 is simply pivoted back into the normal operational position depicted in FIG. 3. However, no removal, reinstallation, and/or replacement of components is required to perform the cleaning operations normally associated with the use of the ADF 252 and imaging apparatus 274.

Figure 4:
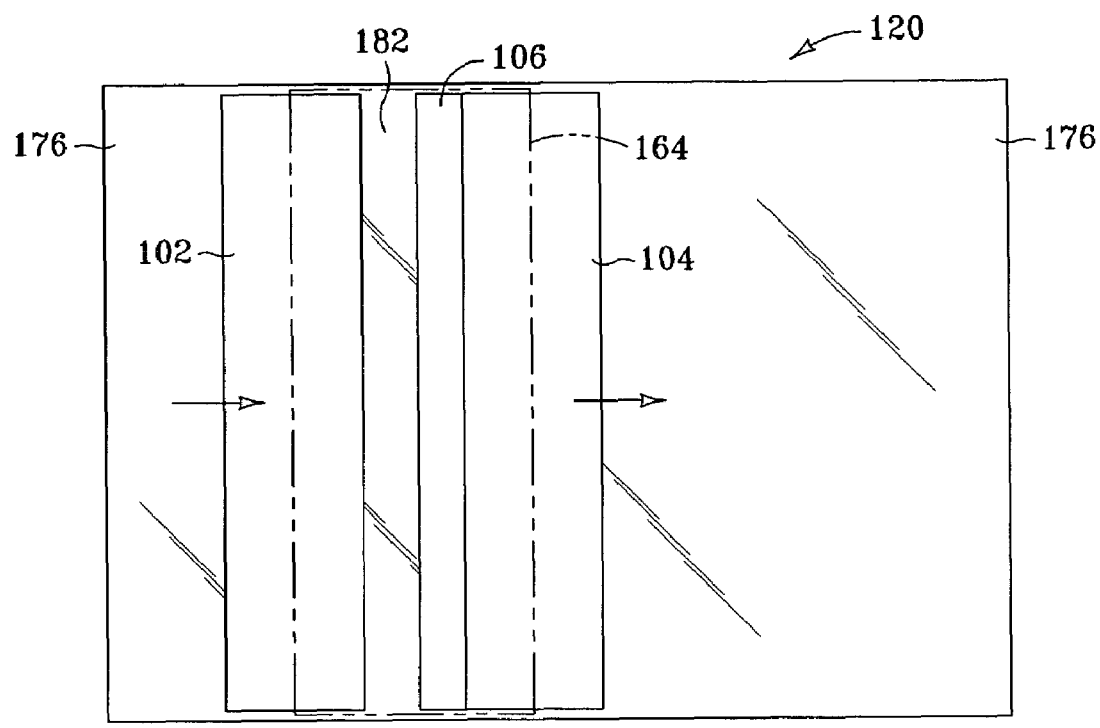
FIG. 4 is a plan view depicting an arrangement of elements, in accordance with one embodiment of the invention.

FIG. 4 depicts a plan view of a portion of the elements of the imaging device 100 as described in regard to FIG. 2, and generally referred to as arrangement 120. The arrangement 120 includes the flatbed 176 and the diverter 106, being disposed in substantially coplanar relationship. The flatbed 176 includes the scan window 182 in lateral adjacency to the diverter 106. The arrangement 120 also includes the first document guide 102 and the second document guide 104, which are located in spaced-apart relationship such that the scan window 182 and the diverter 106 are generally disposed there between.

The arrangement 120 further includes a phantom representation of the feed guide 164, which is typically supported elevationally over and longitudinally parallel to the scan window 182. The first and second document guides 102 and 104 of the arrangement 120 are understood to be supported elevationally between the feed guide 164 and the flatbed 176. As shown in FIG. 4, the scan window 182, the diverter 106, the first document guide 102, the second document guide 104 and the feed guide 164 extend substantially across the full width of the flatbed 176. In another possible embodiment, (not shown), one or more of the elements 102, 104, 106 and 164 extend less than the full width of the flatbed 176. Other embodiments are possible.

Figure 5:
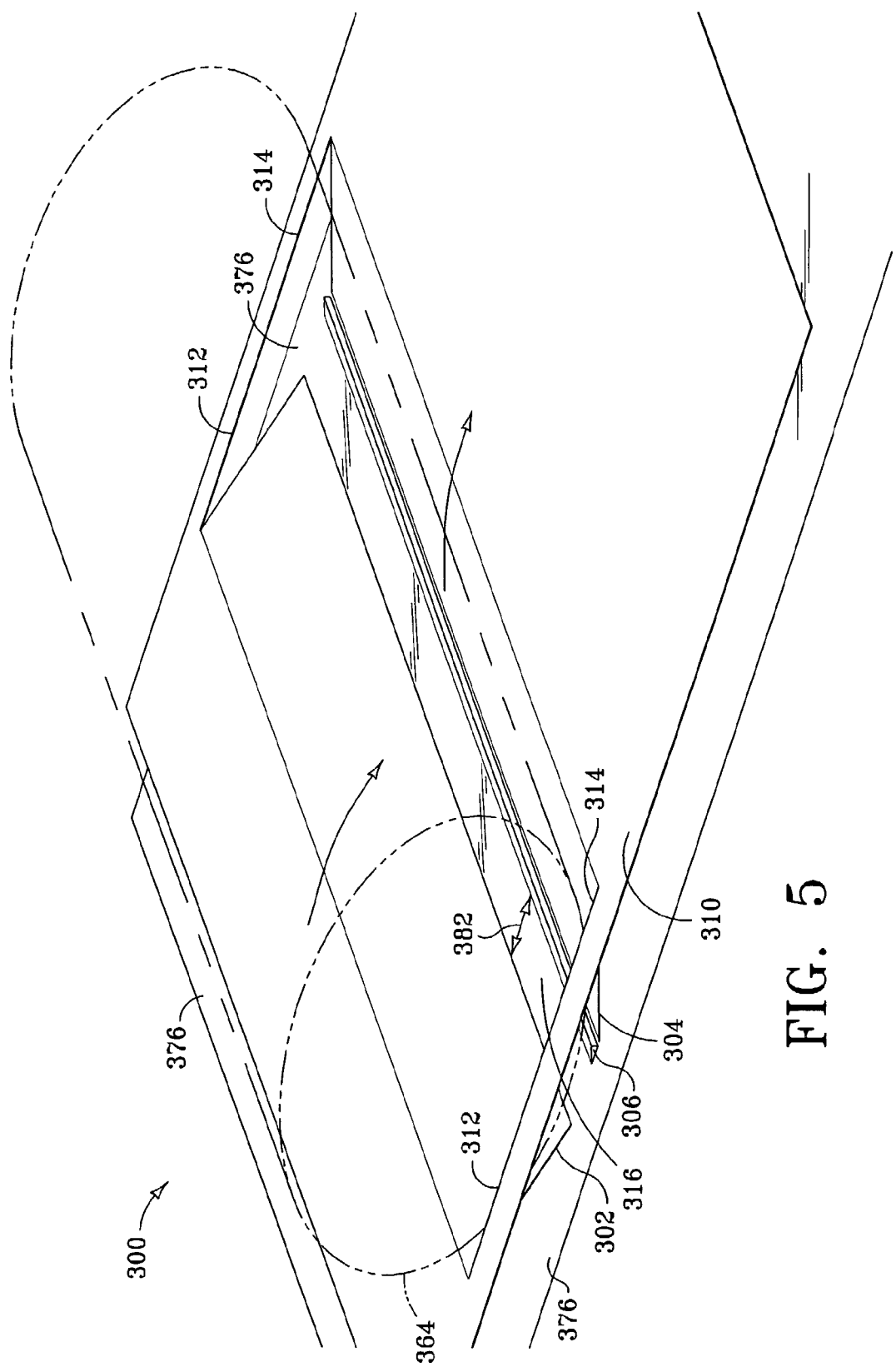
FIG. 5 is a plan view depicting an arrangement of elements, in accordance with yet another embodiment of the invention.

FIG. 5 depicts a perspective view of a portion of imaging device elements in accordance with an alternative embodiment of the invention, generally referred to as arrangement 300. The arrangement 300 includes a single sheet of material 310, which can be Mylar®, or any other flexible, resilient material suitable for guiding sheet media (not shown) through an ADF.

The sheet material 310 includes respective first and second document guide regions 302 and 304, which are defined by respective cuts or incisions 312 and 314 formed in the material 310. The cuts 312 and 314 permit each of the first and second document guide regions 302 and 304 to assume independently flexed, angular relations to the rest of the sheet 310. Thus, the first and second sheet guide regions 302 and 304 are formed integral with the sheet 310 and are respectively part of a single entity. The sheet material 310 further includes a through aperture 316 that defines a spacing or void between the first document guide 302 and the second document guide 304.

The arrangement 300 includes a flatbed 376 comprised of glass or another suitable optically transparent material. The flatbed material has a defined scan window region 382. Further included in arrangement 300 is a diverter 306 that is located laterally of the scan window 382 and being substantially coplanar with the flatbed 376. The arrangement 300 further includes a phantom outline of a feed guide 364, shown for clarity of understanding.

The arrangement 300 is depicted in FIG. 5 in its normal usage orientation. The sheet material 310, having the first and second document guide regions 302 and 304, generally overlies the flatbed 376 such that the aperture 316 is aligned with the scan window 382. The first and second document guide regions 302 and 304 are supported (not shown) in close angular or contacting relationship with the flatbed 376 and the diverter 306, respectively. The feed guide 364 is generally aligned with the scan window 382 and the through aperture 316.

In use, sheet media (not shown) can be routed between the feed guide 364 and the scan window 382, in a generally left to right motion, via the cooperation of the feed guide 364, the first and second document guide regions 302 and 304, and the diverter 306 in similar arrangement as the respective first and second document guides 102 and 104 of FIG. 2, or 202 and 204 of FIG. 3. It is readily apparent to one of skill in the pertinent art that the sheet 310 may be processed by conventional stamping, cutting, or other techniques, to form the first and second document guide regions 302 and 304 and the through aperture 316 therein. It is understood that the embodiment of the invention depicted in the arrangement 300 can be readily incorporated into an imaging device (not shown) that is substantially similar in function and operation to those previously described in regard to FIGS. 2 and 3.

Therefore, an improved automatic document feeder and a corresponding method for automatically feeding documents have been provided. The automatic document feeder and method of the present invention are suitable for use with both color and monochrome imaging devices, and impose reduced maintenance burdens in comparison to the prior art.

While the above methods and apparatus have been described in language more or less specific as to structural and methodical features, it is to be understood, however, that they are not limited to the specific features shown and described, since the means herein disclosed comprise preferred forms of putting the invention into effect. The methods and apparatus are, therefore, claimed in any of their forms or modifications within the proper scope of the appended claims appropriately interpreted in accordance with the doctrine of equivalents.

We claim:

1. An automatic document feeder configured for use in conjunction with an imaging device, comprising:
   a feed guide supported in spaced overlying relation to a scan window of the imaging device; and
   first and second document guides supported in spaced relation with each other and proximate the scan window, the first and second document guides being configured to guide a sheet media between the feed guide and the scan window, wherein, in use, the sheet media is the only element present between the scan window and the feed guide and wherein the second document guide is further configured to cooperate with a diverter supported laterally of the scan window.

2. An automatic document feeder configured for use in conjunction with an imaging device, comprising:
 a feed guide supported in spaced overlying relation to a scan window of the imaging device; and
 first and second document guides supported in spaced relation with each other and proximate the scan window, the first and second document guides being configured to guide a sheet media between the feed guide and the scan window, wherein, in use, the sheet media is the only element present between the scan window and the feed guide and wherein the second document guide is further configured to cooperate with a channel located laterally of the scan window.

3. A sheet guiding apparatus for use in an automatic document feeder configured to work in conjunction with a scanning apparatus having a scan window defined by an upper surface, the sheet guiding apparatus comprising first and second document guides in spaced-apart relationship such that a void is defined there between, the void not being bridged by a bridging component, and wherein the first and second document guides are configured to guide a sheet media across the void through a gap defined by a lower surface of a feed guide and the upper surface of the scan window and wherein the second document guide is further configured to cooperate with a diverter supported laterally of the scan window.

4. A sheet guiding apparatus for use in an automatic document feeder configured to work in conjunction with a scanning apparatus having a scan window defined by an upper surface, the sheet guiding apparatus comprising first and second document guides in spaced-apart relationship such that a void is defined there between, the void not being bridged by a bridging component, and wherein the first and second document guides are configured to guide a sheet media across the void through a gap defined by a lower surface of a feed guide and the upper surface of the scan window and wherein the scan window is defined by a flatbed, and further wherein the second document guide is further configured to cooperate with a channel defined in the flatbed and located laterally of the scan window.

5. A scanning apparatus comprising:
 a flatbed comprising optically transparent material and having a region defining a scan window;
 a feed guide supported in spaced overlying relation to the scan window and configured to guide a sheet media through a gap between the feed guide and the scan window;
 a first document guide supported in generally sloped lateral relation to the scan window, the first document guide being configured to guide the sheet media into the gap;
 a second document guide supported in generally sloped lateral relation to the scan window, the second document guide being configured to guide the sheet media out of the gap; and
 a diverter supported laterally of the scan window and configured to guide the sheet media generally away from the scan window and onto the second document guide.

6. A scanning apparatus comprising:
 a flatbed comprising optically transparent material and having a region defining a scan window;
 a feed guide supported in spaced overlying relation to the scan window and configured to guide a sheet media through a gap between the feed guide and the scan window;
 a first document guide supported in generally sloped lateral relation to the scan window, the first document guide being configured to guide the sheet media into the gap;
 a second document guide supported in generally sloped lateral relation to the scan window, the second document guide being configured to guide the sheet media out of the gap; and
 a channel formed in the flatbed and located laterally of the scan window, wherein the second document guide is further configured to cooperate with the channel to guide the sheet media out of the gap.

* * * * *

UNITED STATES PATENT AND TRADEMARK OFFICE
CERTIFICATE OF CORRECTION

| | |
|---|---|
| PATENT NO. | : 7,251,063 B2 |
| APPLICATION NO. | : 10/310350 |
| DATED | : July 31, 2007 |
| INVENTOR(S) | : Paul K. Mui et al. |

Page 1 of 1

It is certified that error appears in the above-identified patent and that said Letters Patent is hereby corrected as shown below:

In column 4, line 15, delete "no" and insert -- not limited to, such --, therefor.

Signed and Sealed this

Twelfth Day of August, 2008

JON W. DUDAS
*Director of the United States Patent and Trademark Office*